(12) United States Patent
Devanand

(10) Patent No.: US 8,942,376 B2
(45) Date of Patent: *Jan. 27, 2015

(54) APPARATUSES, SYSTEMS, AND METHODS FOR RENEWABILITY WITH DIGITAL CONTENT PROTECTION SYSTEMS

(71) Applicant: Intel Corporation, Santa Clara, CA (US)

(72) Inventor: Priyadarsini Devanand, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/804,780

(22) Filed: Mar. 14, 2013

(65) Prior Publication Data

US 2013/0212696 A1 Aug. 15, 2013

Related U.S. Application Data

(63) Continuation of application No. 12/582,837, filed on Oct. 21, 2009, now Pat. No. 8,411,861.

(51) Int. Cl.
| | | |
|---|---|---|
| H04L 29/02 | (2006.01) | |
| G06F 21/60 | (2013.01) | |
| H04L 29/06 | (2006.01) | |
| H04N 21/4363 | (2011.01) | |
| H04N 21/4367 | (2011.01) | |
| H04L 9/32 | (2006.01) | |
| H04L 15/24 | (2006.01) | |

(52) U.S. Cl.
CPC ............. *G06F 21/60* (2013.01); *H04L 63/10* (2013.01); *H04L 63/20* (2013.01); *H04L 2463/101* (2013.01); *H04N 21/43635* (2013.01); *H04N 21/4367* (2013.01); *H04L 9/321* (2013.01)
USPC .......................................... 380/242; 380/240

(58) Field of Classification Search
None
See application file for complete search history.

(56) References Cited

U.S. PATENT DOCUMENTS

| | | | |
|---|---|---|---|
| 6,748,531 B1 | 6/2004 | Epstein | |
| 7,555,124 B2 * | 6/2009 | Hunt et al. | 380/202 |
| 2004/0003239 A1 | 1/2004 | Ohmori | |
| 2005/0078825 A1 | 4/2005 | Ohmori | |

(Continued)

FOREIGN PATENT DOCUMENTS

| | | |
|---|---|---|
| CN | 101305545 | 11/2008 |
| CN | 101365103 | 2/2009 |
| WO | 2009015216 A1 | 1/2009 |

OTHER PUBLICATIONS

Content Security for IPTV. Jeffrey et al. IEEE(2008).*

(Continued)

*Primary Examiner* — Venkat Perungavoor
(74) *Attorney, Agent, or Firm* — Trop, Pruner & Hu, P.C.

(57) ABSTRACT

In one embodiment of the invention, a format for renewability content (e.g., a System Renewability Message (SRM)) corresponding to a content protection protocol (e.g., High-Bandwidth Digital Content Protection (HDCP)) may be interoperable with devices that are compliant with different versions of the standard (e.g., HDCP1.x and 2.x devices) and that include different amounts of storage for the renewability content (e.g., first and second generation devices).

16 Claims, 6 Drawing Sheets

(56) References Cited

U.S. PATENT DOCUMENTS

2008/0235517 A1    9/2008  Ohmori
2009/0031144 A1    1/2009  Williams

OTHER PUBLICATIONS

Intel Corporation, Digital Content Protection LLC, "Display Port-HDCP Specification Compliance Test Specification," Revision 1.0, Sep. 10, 2007, pp. 1-85.

Intel Corporation, Digital Content Protection LLC, "High-Bandwidth Digital Content Protection System," Interface Independent Adaptation, Revision 2.0, Oct. 23, 2008, pp. 1-58.

U.S. Appl. No. 12/154,766, filed May 27, 2008, entitled "Methods and Apparatus for Protecting Digital Content," by Gary Graunke, et al.

State Intellectual Property Office of the People's Republic of China, Notification of the 2nd Office Action, dated Nov. 21, 2013, in corresponding Chinese application No. 201010539357.9.

State Intellectual Property Office of the People's Republic of China, Notification of the First Office Action, dated May 21, 2014, in corresponding Chinese application No. 201010539357.9.

* cited by examiner

304

| Name | Size (bits) | Function |
| --- | --- | --- |
| SRM ID | 4 | A value of 0x9 signifies that the message is for HDCP. All other values are reserved. SRMs with values other than 0x9 must be ignored. |
| HDCP2 Indicator | 4 | A value of 0x1 signifies that the message is for HDCP2 |
| Reserved | 8 | Reserved for future definition. Must be 0x00 |
| SRM Version | 16 | Sequentially increasing unique SRM numbers. Higher numbered SRMs are more recent |
| SRM Generation Number | 8 | Indicates the generation of the SRM. The generation number starts at 1 and increases sequentially |
| Length | 24 | Length in bytes and includes the combined size of this field (three bytes) and all following fields contained in the first-generation SRM portion, i.e., size of this field, Number of Devices field, Reserved (22 bits) field, Device IDs field and Digital Content Protection LLC signature field (384 bytes) in the first-generation SRM portion |
| Number of Devices | 10 | Specifies the number (N1) of Receiver IDs / KSVs contained in the first-generation SRM portion |
| Reserved | 22 | Reserved for future definition. All bits set to 0 |
| Device IDs | 40 * N1<br><br>Max size for this field is 37760 (4720 bytes) | Receiver IDs / KSVs |
| DCP LLC Signature | 3072 | A cryptographic signature calculated over all preceding fields of the SRM. RSASSA-PKCS1-v1_5 is the signature scheme used as defined by PKCS #1 V2.1: RSA Cryptography Standard. SHA-256 is the underlying hash function |

| Name | Size (bits) | Function |
|---|---|---|
| Length | 16 | Length in bytes and includes the combined size of this field (two bytes) and all following fields contained in this next-generation extension portion, i.e., size of this field, Number of Devices field, Reserved (6 bits) field, Device IDs field and Digital Content Protection LLC signature field (384 bytes) in this next-generation SRM portion |
| Reserved | 6 | Reserved for future definition. All bits set to 0 |
| Number of Devices | 10 | Specifies the number (N2) of Receiver IDs / KSVs contained in this next generation extension portion |
| Device IDs | 40 * N2 | Receiver IDs / KSVs |
| DCP LLC Signature | 3072 | A cryptographic signature calculated over all preceding fields of the SRM. RSASSA-PKCS1-v1_5 is the signature scheme used as defined by PKCS #1 V2.1: RSA Cryptography Standard. SHA-256 is the underlying hash function |

FIG. 4B

APPARATUSES, SYSTEMS, AND METHODS FOR RENEWABILITY WITH DIGITAL CONTENT PROTECTION SYSTEMS

This application is a continuation of U.S. patent application Ser. No. 12/582,837, filed Oct. 21, 2009, the content of which is hereby incorporated by reference.

BACKGROUND

Content protection systems, such as High-bandwidth Digital Content Protection (HDCP) compliant systems, securely transmit digital content from a source device (e.g., set-top box, optical disk player, notebook computer) to a receiver device (e.g., high-definition television) via high-bandwidth interfaces (e.g., HDCP-protected interfaces) and possibly via one or more intermediary repeater devices. The protected digital content may include, for example, compressed or uncompressed digital video data included on a digital versatile disk (DVD) or in a transmission of cable content. HDCP techniques are described in various HDCP Specification versions (e.g., HDCP 1.3, HDCP 2.0).

Before transferring content from a source device to a receiver device, however, the source device may need to first authenticate the receiver device is eligible to receive the content. This authentication may be based on the receiver device's secret keys and identification information. For example, each HDCP version 1.x compliant receiver may include a unique identifier such as a unique Key Selection Vector (KSV). The identifier may include any form of identification (e.g., 40 bit sequence, key, etc.) that identifies the device. If an HDCP 1.x receiver device's secret key were compromised, that receiver's privilege to receive HDCP content may be revoked and its identifier (i.e., KSV) may be included on a revocation list found within privilege renewability content, such as a System Renewability Message (SRM) in HDCP systems. Privilege renewability content includes content that may be used to update whether a device or group of devices continues to be allowed rights or access to certain protected content. SRMs may be delivered to a source device (e.g., DVD player) along with, for example, movie content included on a DVD. Source devices continually check for newly released SRMs, which may be included in newly released DVDs, that include the most up-to-date lists of privilege revoked devices. Pursuant to a DVD player source device's attempt to play the movie on a high-definition television receiver device, the DVD player may receive the television's KSV. The DVD player may then determine if the KSV of the receiver device is found in the SRM that was included in the newly received DVD. If the KSV is found in the SRM's revocation list, authentication fails and the DVD player will not send the content to the television.

Release of HDCP 1.x versions have been followed by the release of, for example, a HDCP 2.x specification (e.g., HDCP 2.0). Each HDCP version 2.x receiver may include an identifier, such as a unique Receiver ID similar to a KSV used in HDCP 1.x receiver devices. A compromised receiver's Receiver ID may be included in an SRM that is distributed to source devices. If the Receiver ID is found in the revocation list, authentication between the source and receiver devices fails, the authentication protocol is aborted, and transmission of HDCP content to the receiver device is stopped.

In heterogeneous systems which have both HDCP 1.x and HDCP 2.x receivers, a HDCP 1.x may need to communicate with both HDCP 1.x and 2.x receivers. Thus, a HDCP 1.x source device playing a DVD may need to use a newly updated HDCP 1.x compliant SRM included in a DVD to identify both HDCP 1.x and HDCP 2.x receivers whose HDCP privileges have been revoked. Similarly, a HDCP 2.x source playing that same DVD may also need to use a newly updated HDCP 2.x compliant SRM included in the DVD to identify both HDCP 1.x and HDCP 2.x receivers whose HDCP privileges have been revoked. An interoperable and scalable format for privilege renewability content may allow for continued upgrades or renewals of revocation lists in systems including legacy and newer devices that may be compatible with different versions of content protection systems.

BRIEF DESCRIPTION OF THE DRAWINGS

Features and advantages of the present invention will become apparent from the appended claims, the following detailed description of one or more example embodiments, and the corresponding figures, in which:

FIGS. 4a and 4b are block diagrams of example embodiments of SRM formats that may be used in the data processing environment of FIG. 1.

DETAILED DESCRIPTION

Figure 1:
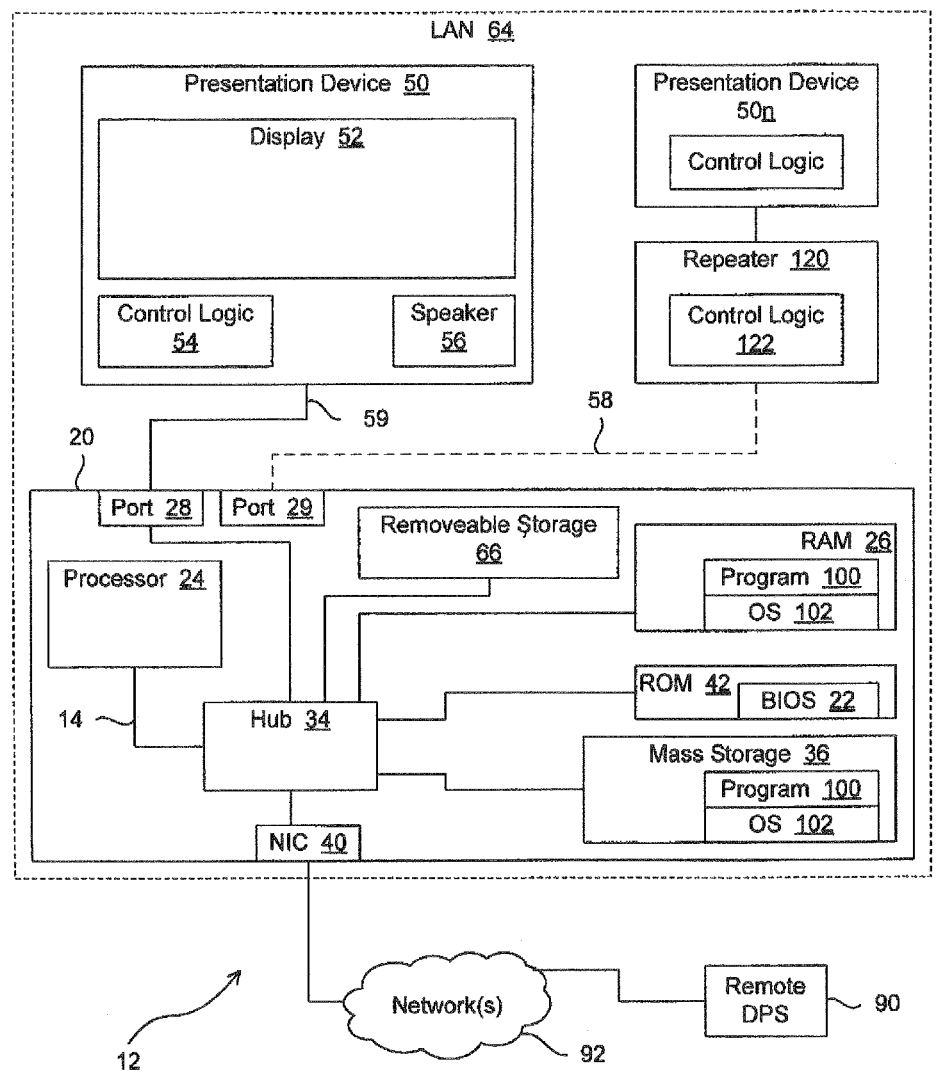
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 having processor 24, random access memory (RAM) 26, and read-only memory (ROM) 42. Alternatively, a data processing system may include multiple processors. Processor 24 may include one or more processing units or cores. Such processing units may be implemented as, for example, Hyper-Threading (HT) technology or as any other suitable technology for executing multiple threads or instructions simultaneously or substantially simultaneously.

Processing system 20 may also include components that may be communicatively coupled via one or more system buses 14 or other communication pathways or mediums. The term "bus" may refer herein to shared (e.g., multi-drop) communication pathways, as well as point-to-point pathways, interconnect rings, etc. In the embodiment of FIG. 1, processing system 20 includes one or more volatile and/or non-volatile data storage devices, such as RAM 26, ROM 42, mass storage devices 36 such as hard drives, and/or other devices or media. Processing system 20 may include one or more removable storage devices 66, such as drives for DVDs or other kinds of optical disks, floppy disk drives, tapes, flash memory, memory sticks, etc. The terms "read-only memory" and "ROM" may be used herein in general to refer to non-volatile memory devices such as erasable programmable ROM (EPROM), electrically erasable programmable ROM (EEPROM), flash ROM, flash memory, etc. Processing system 20 may also have a chipset, a bridge, a hub 34, and/or other modules which serve to interconnect various hardware components.

Processing system 20 may be controlled, at least in part, by input from input devices such as a keyboard, a mouse, a remote control, etc., and/or by directives received from another machine, biometric feedback, or other input sources or signals. Processing system 20 may utilize one or more communication ports and one or more wired or wireless connections to communicate with one or more other data processing systems. Communication ports may also be referred to as input/output (I/O) ports, and they may be implemented as parallel ports, serial ports, universal serial bus (USB) controllers, high-definition multimedia interface (HDMI) ports, network interface controllers (NICs), modems, etc.

In various embodiments, processing systems may be interconnected by way of a physical and/or logical network, such as a local area network (LAN), a wide area network (WAN), an intranet, the Internet, etc. Network communications may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols.

Embodiments of the invention may be described herein with reference to data such as instructions, functions, procedures, data structures, application programs, configuration settings, etc. When the data is accessed by a machine, the machine may respond by performing tasks, defining abstract data types, establishing low-level hardware contexts, and/or performing other operations, as described in greater detail below. The data may be stored in volatile and/or non-volatile data storage. For purposes of this disclosure, the term "program" covers a broad range of components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. The term "program" may also be used to refer to a set of one or more instructions resulting from processes such as translation, interpretation, compilation, linking, etc. Thus, the term "program" may be used to refer to any collection of instructions which, when executed by a processing system, performs a desired operation or operations.

In the embodiment of FIG. 1, processing system 20 may include resources such as, for example, ROM 42 which may include a basic input/output system (BIOS) 22, and mass storage device 36 which may contain an operating system (OS) 102 and at least one program 100. Processing system 20 can use BIOS 22 to boot, and can copy OS 102 and program 100 into RAM 26 and then execute OS 102 and program 100 on processor 24.

In one embodiment, processing system 20 is configured to operate as a set-top box and/or an optical disk player, and processing system 20 can send digital content to one or more external processing systems. For example, processing system 20 may provide digital video to presentation devices 50 and 50n, possibly via one or more repeater devices 120. Program 100 may include control logic for authenticating downstream devices, encrypting content, and transmitting the encrypted content to authenticated devices, etc.

Similarly, presentation device 50 may include control logic 54 for authenticating presentation device 50 to processing system 20, for decrypting protected digital content received from processing system 20, and for presenting that content. For instance, presentation device 50 may include a high-definition display 52 and one or more speakers 56 for presenting content to the user. Presentation device 50n may include similar components.

Repeater device 120 may also include control logic 122 supporting the use of protected digital data. For example, control logic 122 may cause repeater 120 to authenticate itself to processing system 20, and for authenticating downstream devices, such as presentation device 50n. In addition, a device may be configured to serve as both a repeater and a presentation device. That is, certain devices may be capable of both presenting content and forwarding content to other presentation devices.

Regarding control logic, in the embodiment of FIG. 1 program 100 resides in mass storage 36. However, in other embodiments, some or all of that control logic may reside elsewhere (e.g., in ROM 42). Example embodiments of various operations to be performed by processing system 20, the presentation device(s), and the repeaters (if any) are described in greater detail below.

Processing system 20 may be referred to herein as the source device, since it transmits protected content. Repeater 120 and presentation devices 50 and 50n may be referred to herein as receiving/receiver devices or downstream devices, since they may ultimately receive the content transmitted by the source device.

In the embodiment of FIG. 1, the source device and all downstream devices are part of a LAN 64. In particular, processing system 20 communicates with presentation device 50 via an I/O port 28 and a wired connection 59. Processing system 20 also communicates with repeater 120 via an I/O port 29 and a wireless connection 58. Thus, LAN 62 includes a wireless LAN (WLAN) that includes processing system 20 and repeater 120. In other embodiments, the source device and downstream devices may use all wired connections, all wireless connections, or other combinations of wired and wireless connections. Processing system 20 may also communicate with one or more remote data processing systems via a WAN. For instance, processing system 20 may use a NIC 40 and a WAN 92 to download content from remote data processing system 90.

Figure 2:
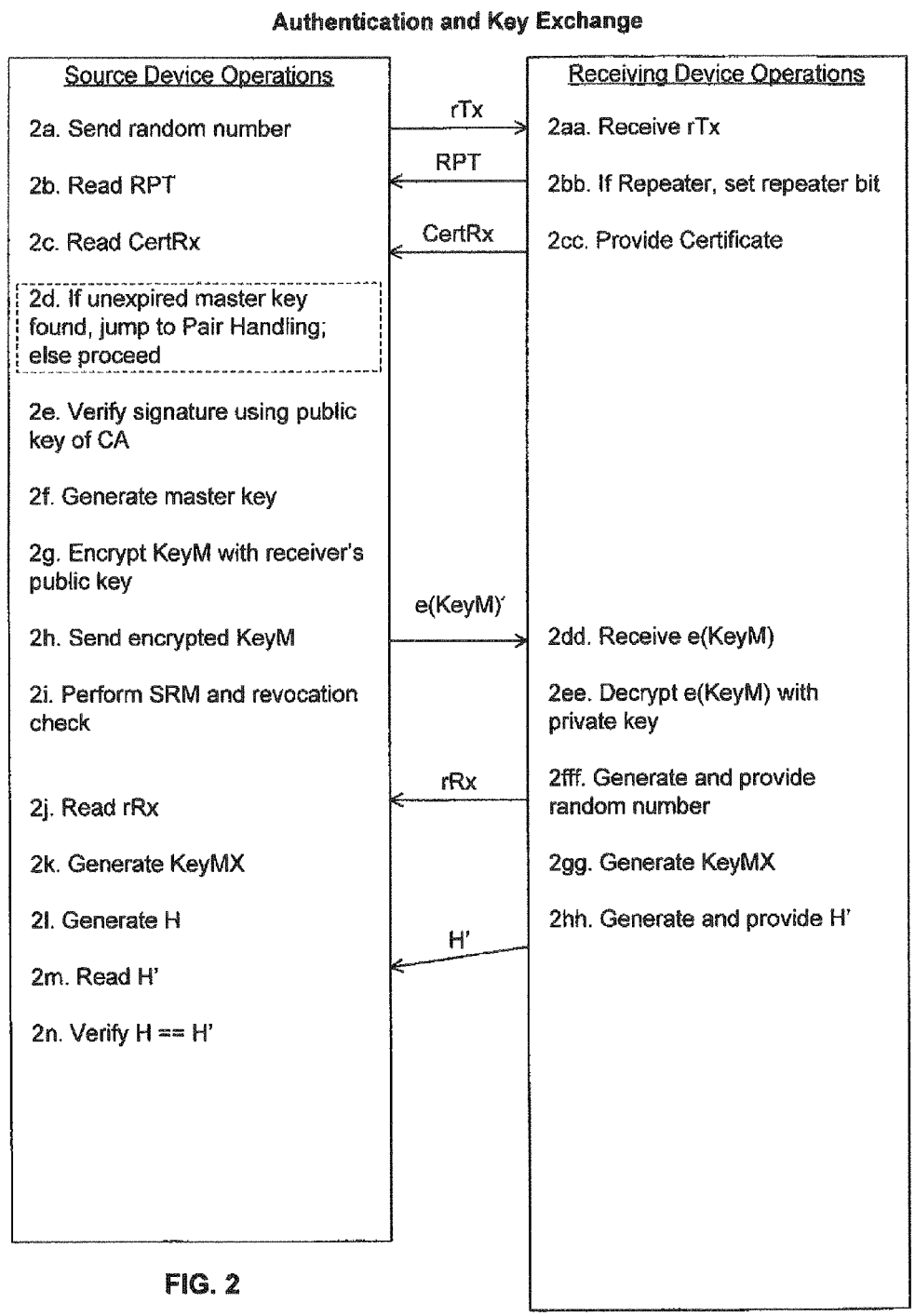
FIG. 2 is a diagram of an example embodiment of a process for authenticating devices and exchanging keys, in the context of the data processing environment of FIG. 1.

FIG. 2 is a diagram of an example embodiment of a method for protecting digital content, in the context of data processing environment 12. The illustrated process includes operations for device authentication and key exchange. As indicated by the headings in the two boxes of FIG. 2, the operations may be performed by a source device and a receiving or receiver device. For example, processing system 20 may operate as the source device, and presentation device 50 or repeater 120 may operate as the receiving device.

In one embodiment, all source, repeater, and presentation devices include two different values (e.g., source keys) that are provided by a central licensing authority (e.g., Digital Content Protection, LLC (DCP)) under predetermined license terms. For instance, the license terms may prohibit the disclosure of those values to any party that has not agreed to the license terms. In the embodiment of FIG. 1, those two values may be a 64-bit value and a 128-bit value. All devices may include the same 64-bit value and the same 128-bit value, and those values may remain static. Accordingly, those values may be referred to as a 64-bit global licensed constant and a 128-bit global licensed constant, respectively. The 64-bit global licensed constant may be referred to as LC64, and the 128-bit global licensed constant may be referred to as LC128.

For example, the manufacturer of a device may order a pair of licensed constants from the licensing authority. The manufacturer may store the licensed constants in the device during manufacture of the device, before the device is distributed to an end user.

The licensing authority may also serve as a certificate authority (CA). Entities or organizations that produce devices may subscribe with the CA, and the CA may provide each such entity or organization with a unique entity identifier. The CA may serve as root trust authority, and may keep records that associate public keys with respective subscribers. The CA may also sign digital certificates for approved devices, to attest that a particular public key corresponds to a particular unique entity identifier. For instance, the manufacturer of a device can obtain a digital certificate from the CA and load the certificate into a device, and the device can thereafter use the certificate as proof that the device is an approved device. A challenger can use the digital certificate to verify that a public key in the certificate is authorized by the CA and belongs to the entity (e.g., the device manufacturer) identified by the certificate. In one embodiment, DCP may serve as the licensing authority and CA. Since the certificates are used to protect rights to digital content, the CA may also be referred to as a digital rights management (DRM) authority.

In the embodiment of FIG. 1, the source device (e.g., processing system 20) also includes the public key of the CA. For instance, that public key may be a 3072-bit Rivest, Shamir, Adleman (RSA) public key, denoted by KeyPubCA.

The first stage in the authentication protocol may be referred to as authentication and key exchange (AKE). Processing system 20 may initiate authentication at any time, even before a previous authentication exchange has completed. To initiate authentication of a downstream device, processing system 20 generates a random number "rTx," and transmits rTx to the downstream device (e.g., presentation device 50), as shown at line 2a. For example, processing system 20 may initiate authentication in response to detecting an active downstream receiving device, in response to detecting a request from an upstream content control function to initiate authentication before playing a protected movie, etc. For instance, when serving as a DVD player, the source device may initiate authentication in response to detecting an attempt to play content that is protected by the Content Scramble System (CSS). In the embodiment of FIG. 2, the initiation message (i.e., rTx) is a 64-bit pseudo-random value.

If the device receiving rTx is a repeater, it may respond to the rTx by setting a repeater bit "RPT" in the repeater that can be read by processing system 20, as shown at lines 2aa and 2bb. If the device receiving rTx is a repeater or a presentation device, the receiver responds to the rTx by making a certificate available for processing system 20 to read, as shown at line 2cc. For example, if the device receiving rTx is presentation device 50, presentation device 50 responds by making a public key certificate available to processing system 20.

In the embodiment of FIG. 1, presentation devices 50 and 50n and repeater 120 each contain a public key certificate issued by the CA. That certificate, which may be referred to as CertRx in HDCP 2.x, includes the following fields: Receiver ID, Receiver Public Key, Reserved, and CA Signature. A Receiver ID may occupy a number of bits (e.g., 40, 64, etc.), and store a unique receiver identifier. A Receiver Public Key may occupy 1048 bits and store a unique RSA public key of the receiver. This key may be referred to as KeyPubRx. The first 1024 bits hold the big-endian representation of the modulus "n," and the trailing 24 bits hold the big-endian representation of the public exponent "e." "Reserved" may represent 16 bits that are reserved for future definition. This field may contain 0x0000 (where the prefix "0x" denotes hexadecimal notation). "CA Signature" may occupy 3072 bits and store a cryptographic signature calculated over all preceding fields of the certificate. The CA generates this signature using the signature scheme known as "RSA Signature Scheme with Appendix—Public-Key Cryptography Standards 1-v1_5" or "RSASSA-PKCS 1-v1_5," defined by Public-Key Cryptography Standards (PKCS) #1 V2.1: RSA Cryptography Standard, dated Jun. 14, 2002. The secure hash method (SHA) SHA-256 is used as the underlying hash function.

All values in the certificate may be stored in big-endian format. In addition, each presentation device and repeater also includes the private key corresponding to the public key for that device. Such a private key may be referred to as KeyPriv. In the embodiment of FIG. 1, each device keeps its KeyPriv in secure storage, and each KeyPriv is a 1024-bit RSA private key.

As shown at line 2b, processing system 20 may read RPT from the downstream device. As described in greater detail below, if RPT is set, processing system 20 may subsequently perform authentication with repeaters.

As shown at line 2c, after reading RPT, processing system 20 reads CertRx from the downstream device. Processing system 20 may then extract the Receiver ID and KeyPubRx from CertRx. Processing system 20 may then use the Receiver ID to determine whether or not a technique referred to as "pairing" should be used to authenticate presentation device 50. For instance, processing system 20 may determine whether processing system 20 already contains a master key that corresponds to the Receiver ID. If processing system 20 finds a master key associated with the Receiver ID, the process may jump to a pair handling process, as shown at line 2d.

However, if no such master key is found, processing system 20 may respond by using PKI techniques to authenticate presentation device 50 (e.g., to determine whether presentation device 50 is trustworthy). For instance, in the embodiment of FIG. 2, processing system 20 uses the public key of the CA to verify the signature in CertRx, as shown at line 2e. Failure of signature verification constitutes an authentication failure, and in response, processing system 20 may abort the authentication protocol.

However, upon successful verification, processing system 20 may generate a master key "KeyM," as shown at line 2f. In one embodiment, the source device generates a random 128-bit master key. As shown at line 2g, processing system 20 may then use KeyPubRx to encrypt KeyM. In one embodiment, the encrypted KeyM "e(KeyM)" is 1024 bits long; the source device uses the encryption scheme known as "RSA Encryption Scheme—Optimal Asymmetric Encryption Padding" or "RSAES-OAEP," as defined by PKCS #1 V2.1; and SHA-256 is the underlying hash function. As shown at line 2h, processing system may then send e(KeyM) to presentation device 50.

Processing system 20 may then verify integrity of a SRM of presentation device 50 and may also perform a revocation check, as shown at line 2i. For example, processing system 20 may check the signature of the SRM using KeyPubCA. Failure of this integrity check constitutes an authentication failure and causes processing system 20 to abort the authentication protocol. If presentation device 50 passes the integrity check, processing system 20 determines whether the Receiver ID of the attached device is found in a revocation list. Processing system 20 may obtain revocation lists as part of content and/or SRMs, for example. For instance, an SRM may be received on a DVD containing a protected movie, as part of cable content transmission, etc.

If the Receiver ID is found in the revocation list, authentication may fail and the authentication protocol may be aborted. In one embodiment, the SRM integrity check and revocation check are performed only by the top-level source device. Also, similar SRM integrity and revocation checks may be conducted in conjunction with the "pairing" technique, addressed above in regards to line 2d, employed when an unexpired master key is found.

In response to receiving e(KeyM), presentation device 50 uses its private key to decrypt KeyM, as shown at lines 2dd and 2ee. In one embodiment, the receiving device decrypts KeyM with its private key, using the RSAES-OAEP decryption scheme. After receiving e(KeyM), presentation device 50 generates a random number "rRx," and makes rRx available to processing system 20, as shown at line 2ff. In one embodiment, rRx is a 128-bit random value.

If presentation device 50 has passed the integrity and revocation checks, processing system 20 reads rRx, as shown at line 2j. In response, processing system 20 generates another key, based on (a) the random master key that was generated by processing system 20 and (b) the random number rRx that was generated by presentation device 50. Since this key is based on values generated by different devices, the key may be referred to as a combined key, a merged key, or a mixed key. In one embodiment, processing system 20 generates the mixed key by performing an exclusive-or (XOR) operation on KeyM and rRx. Accordingly, this mixed key may be referred to as KeyMX. For instance, presentation device 50 may compute KeyMX=KeyM XOR rRx, as shown at line 2k.

Processing system 20 may then compute a hash value "H," as shown at line 2l. In one embodiment, H is a 256-bit value generated by the hash-based message authentication code (HMAC) function HMAC-SHA256. For instance, processing system 20 may compute H=HMAC-SHA256(rTx, LC128||KeyM), where HMAC-SHA256 is computed over rTx, and the key used for HMAC is the concatenation of LC128 and KeyM, with LC128 in big-endian order, and KeyM appended in big-endian order.

Presentation device 50 may use substantially the same approach as processing system 20 to generate KeyMX and the hash value "H'," as shown at lines 2gg and 2hh. Presentation device 50 may then make H' available to processing system 20. In one embodiment, presentation device 50 makes H' available for the source device to read within a predetermined time interval from the time that the source device finishes writing e(KeyM) to the receiver. Similarly, the source device waits at least that time interval after sending e(KeyM) to the presentation device before reading H' from the presentation device. The predetermined period of time may be one second, for example. Accordingly, processing system 20 may read H' from presentation device 50 after waiting a suitable time, as shown at line 2m.

Processing system 20 may then verify whether H equals H', as shown at line 2n. Processing system 20 may consider a mismatch between H and H' to constitute an authentication failure, and in response may abort the authentication protocol.

Furthermore, transmitters in such environments are not required to store any unique, secret keys in nonvolatile storage. Instead, a transmitter may store a 3072-bit public key for a CA. A receiver may store its 1024-bit public and private keys, with the private key saved in secure storage. Alternatively, the private key may be stored in the form of a 128 bit seed, from which the 1024-bit key is derived (e.g., using Maurer's method for generating primes). Transmitters, receivers, and repeaters may also store licensed constants, and it may be necessary to keep licensed constants secret, but the licensed constants are not unique, in at least one embodiment.

Generally regarding revocation checks, as mentioned above regarding line 2i of FIG. 2, the source device performs a SRM and revocation check. An authorized participant in the authentication protocol may become compromised so as to expose its RSA private keys for misuse by unauthorized parties. After a party (e.g., DCP) determines that a receiver's private key (e.g., kpriv$_{rx}$) has been compromised the compromised receiver's privilege to receive HDCP content may be revoked by having its unique identity information (e.g., KSV for HDCP 1.x receiver devices, Receiver ID for HDCP 2.x receiver devices, etc.) included in a revocation list that, in one embodiment, is stored in a SRM. For example, in one embodiment revoked receiver identification information may be included in a HDCP 1.x compliant SRM and a HDCP 2.x compliant SRM, both of which are delivered to source devices with content included in, for example, a DVD, cable/satellite transmission, etc. The source device may then attempt to communicate with a receiver device. After loading the DVD, the source device (e.g., transmitter) may establish the validity of the SRM by verifying the integrity of its signature using, for example, a public key such as the DCP public key specified by DCP. The source device may then determine if the KSV or Receiver ID of the candidate receiver device is found in the revocation list of one of the newly received SRMs. If the KSV or Receiver ID is found in the revocation list, authentication between the source device and candidate receiver device may fail, the authentication protocol may be aborted, and transmission of HDCP content may be prevented or stopped.

To complicate matters of SRM usage, however, various HDCP devices may only be compatible with certain HDCP specifications and may have limited storage available for SRM storage. For example, an HDCP 1.x compliant device may process a HDCP 1.x compliant SRM but not a HDCP 2.x compliant SRM. Also, an HDCP2.x compliant device may process a HDCP 2.x compliant SRM but not a HDCP 1.x compliant SRM. Thus, to foster interoperability among HDCP devices and specifications HDCP 1.x source devices playing a DVD may need to use a newly updated HDCP 1.x compliant SRM included in, for example, a DVD to identify both HDCP 1.x and HDCP 2.x receivers whose HDCP privileges have been revoked. Similarly, HDCP 2.x source devices playing that same DVD may also need to use a newly updated HDCP 2.x compliant SRM included in the DVD to identify both HDCP 1.x and HDCP 2.x receivers whose HDCP privileges have been revoked.

Figure 3:
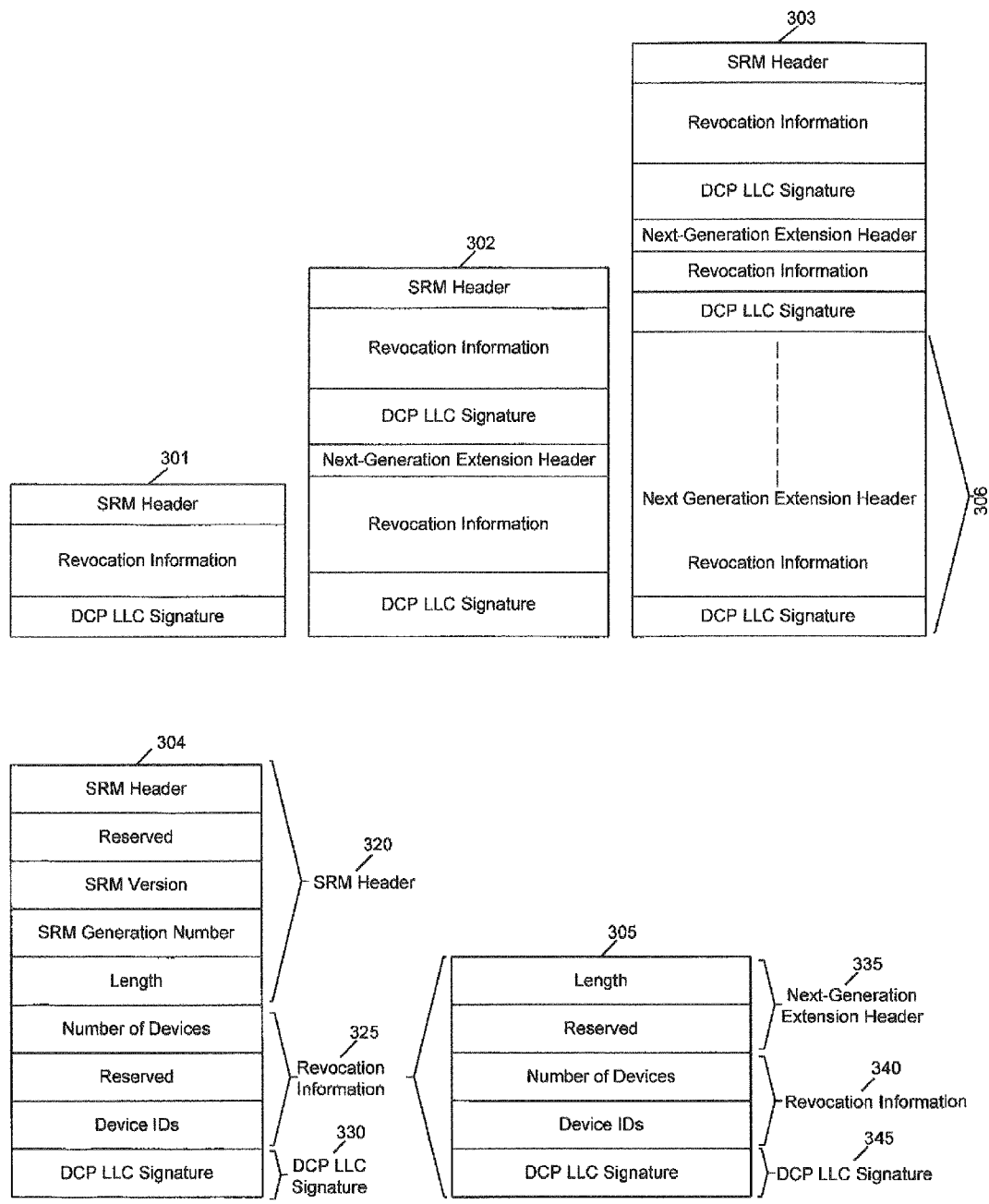
FIG. 3 is a block diagram of an example embodiment of SRM formats that may be used in the data processing environment of FIG. 1.

FIG. 3 is a block diagram of several SRM formats in one embodiment of the invention. The SRM formats may be interoperable with both legacy devices and newer devices that include differing memory capacities for SRM storage. Also, the SRM formats may allow SRM handling and revocation in heterogeneous systems that include HDCP devices compatible with different versions of content protection specifications (e.g., HDCP 1.x and HDCP 2.x).

Generally, SRM 301 is a "First Generation" SRM that may be applicable to first generation devices that may be HDCP 1.x, 2.x, or n.x compliant devices. SRM 302 is a "Second Generation" SRM compatible with second generation devices, which may be HDCP 1.x, 2.x, or n.x compliant devices, and includes a second generation extension portion appended to the base first generation portion 301. SRM 303 is an "Nth Generation" SRM compatible with Nth generation devices, which may be HDCP 1.x, 2.x, or n.x compliant devices, and includes additional HDCP n.x extensions appended to base portions 301, 302.

More specifically, "First Generation" devices, whether they be HDCP 1.x, 2.x, or n.x compliant devices, may have limited non-volatile memory available for SRM storage such as, for example, 5 kB. Thus, in one embodiment first generation SRM 301 may be limited to, for example, a maximum of 5 kB or more precisely, 5116 bytes. SRM format 304, a more detailed depiction of SRM 301, includes SRM Header 320, Revocation Information 325 including a revocation list or lists of KSVs, and DCP Signature 330. Greater detail regarding fields 320, 325, 330 is provided in FIG. 4a, wherein all values may be stored in big endian format in one embodiment. A DVD may include multiple SRMs. For example, the DVD may include first generation HDCP 1.x, 2.x, and n.x SRMs.

As time goes on and the number of revoked devices increases, newer DVDs may include second generation HDCP 1.x, 2.x, and n.x SRMs. A second generation SRM may have second and next-generation extensions that increase the size of the SRM to beyond 5 kB. This added space may be used to store the increased number of revoked receiver device identities. Thus, second generation SRM 302 may include a first portion similar to SRM 301, including SRM Header 320, Revocation Information 325, and DCP Signature 330, but may also include an extension 305 including Next (i.e., second) Generation Header 335, Revocation Information 340 including additional KSVs and/or Receiver IDs, and another DCP signature 345. Greater detail regarding fields 335, 340, 345 is provided in FIG. 4b, wherein all values may be stored in big endian format in one embodiment. SRM n.x 303 is similar to SRM 2.x 302 but may include additional extensions similar to extension 305.

By supporting multiple generations of SRMs, scalable SRMs 302, 303 can, if required in the future, grow beyond the 5 kB limit of SRM 1.x 301 to accommodate more KSVs and/or Receiver IDs (or any other form of identifier) as the number of revoked devices grows. As will be explained more fully below, the scalability is realized by appending extensions to the previous generation SRM (e.g., 5 kb first generation SRM 301) while still allowing backward compatibility with devices that support only previous-generation SRMs.

Figure 5:
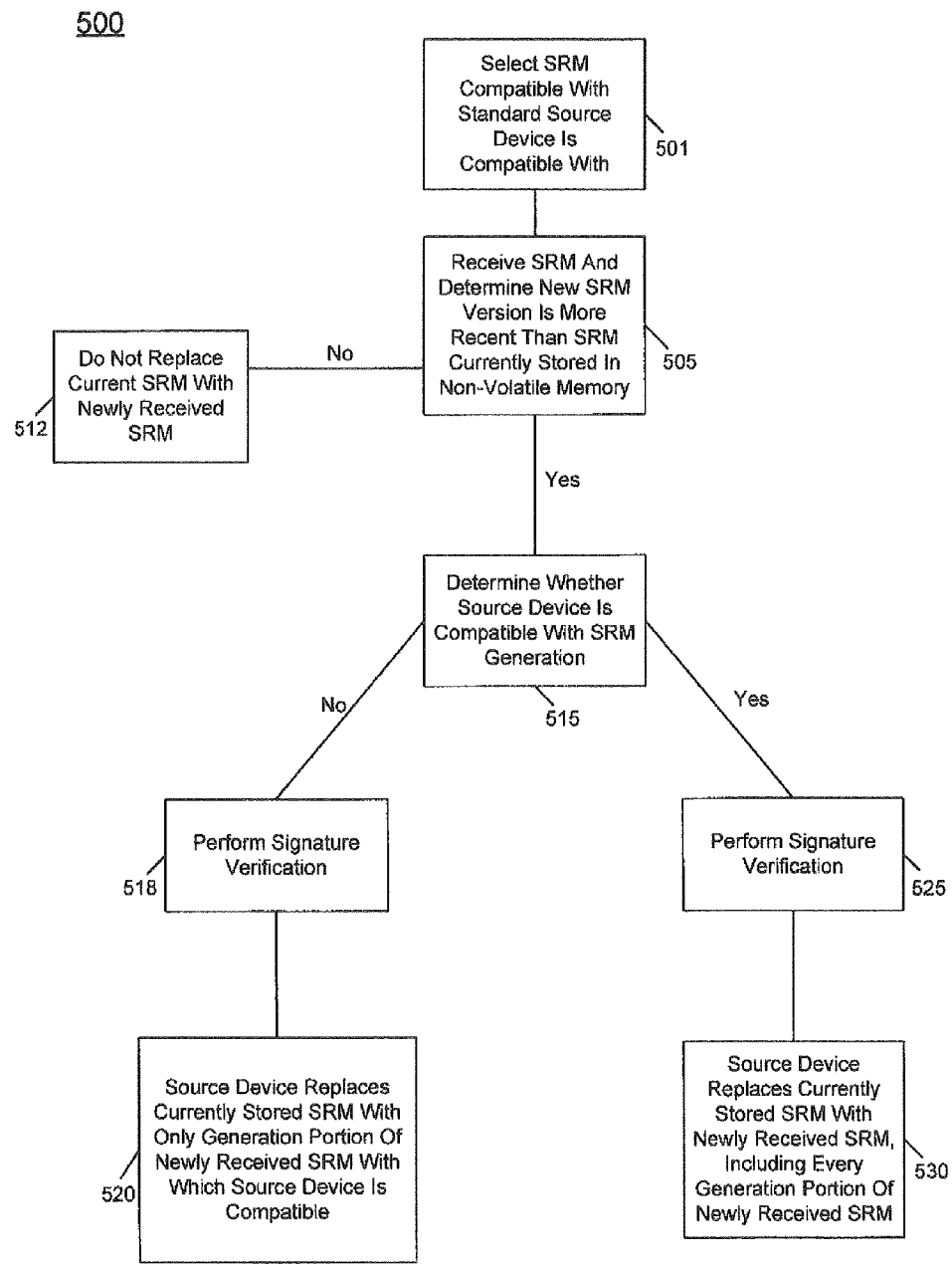
FIG. 5 is a block diagram of a method for upgrading renewability content in a heterogeneous system in one embodiment of the invention.

In conjunction with FIGS. 3-5, an example method 500 of upgrading an SRM with a scalable, multigeneration compatible SRM will now be described. In block 501, if a source device receives, for example, second generation SRM 302 the source device may inspect the "HDCP2 Indicator" field of SRM 302. If the source device is HDCP 2.x compliant, the process may proceed. However, if the source device is HDCP 1.x compliant, and not HDCP 2.x compliant, the source device may instead locate another SRM on the DVD whose "HDCP Indicator" reflects the SRM is not HDCP 2.x compliant but instead, HDCP 1.x compliant.

In block 505, if a source device is HDCP 2.x compliant the source device may inspect the "SRM Version" field of SRM 302 and determine if the version number of the newly received SRM 302 is greater than the version number of any SRM currently stored in the device's non-volatile storage. For example, in FIG. 4a the newly received SRM version is "16." In block 510, if "16" is not greater than the SRM presently stored in the source device (implying that the new SRM is not more recent than the presently stored SRM), the source device may maintain storage of the presently stored SRM instead of replacing the SRM with the newly received SRM 302.

However, if version "16" of SRM 302 is greater than the SRM presently stored in the source device (implying that the new SRM is a more recent than the presently stored SRM), the source device may proceed to block 515. In block 515, the source device may inspect the "SRM Generation Number" field of SRM 302. If, for instance, the source device is a first generation device (HDCP 1.x, 2.x, or n.x compliant) and thus has limited memory (e.g., only 5 kb of non-volatile storage) available for SRM storage, the source device may support only first generation SRMs. As indicated in SRM 302, the "SRM Generation Number" is set to "2." This may indicate a second generation extension 305 is appended to the first 5 kb portion 304 of the SRM. Due to memory constraints of the first generation HDCP 2.x source device, the source device is not required to store the second generation extension portion 305. Instead, in block 518 the source device may verify the SRM signature (e.g., DCP Signature 330). In block 520, the first generation HDCP 2.x device may parse SRM 2.x 302 and only store the first generation SRM portion 304 but not second generation SRM extension portion 305, which is truncated away from SRM portion 304.

In contrast, if the source device receiving SRM 302 is a second generation device (HDCP 1.x, 2.x, or n.x compliant), and thus has more than 5 kb of non-volatile storage available for SRM storage, the source device may support first and second generation SRM portions. In block 525, the source device may verify the SRM signature (e.g., DCP Signature 330). This verification may occur for more than one signature. For example, each SRM generation portion may include a DCP signature (e.g., DCP Signature 330, 345). After successful signature verification(s), in block 530 the HDCP 2.x source device may replace its current SRM in the device's non-volatile storage with the new second generation SRM 302 assuming the current SRM has a version less than "16." Thus, based at least in part on the "SRM Generation Number" field being set to "2" and the source device being a second generation device, the HDCP 2.x device may store first generation SRM portion 304 as well as second generation extension portion 305, unlike a first generation device that may only store first generation SRM portion 304 due to memory constraints.

However, as indicated in block 520, had the second generation source device (HDCP 1.x, 2.x, or n.x compliant) received SRM 303 instead of SRM 302, the second generation device may have parsed SRM 303, stored first and second generations portions 304, 305 but not stored later appended generation extension portions 355, 360. But if the source device receiving SRM 303 is an Nth generation device with more than 5 kb of non-volatile storage available for SRM storage, the source device may support first, second, and subsequent generation SRMs. Thus, after successful signature verification the Nth generation source device may replace its current SRM in the device's non-volatile storage with new SRM 303. The Nth generation device may store the first generation SRM portion 304, the second generation extension portion 305, as well as later generation extension portion or portions 306.

Thus, as shown in SRM formats 301, 302, 303, embodiments of the invention allow for SRM formats that are scalable and interoperable among various generations of devices and various versions of specifications. The above example shows how lower generation devices with less memory may selectively store portions of large, higher generation SRMs. However, below the scenario is addressed where high-generation devices receive lower-generation SRMs that nevertheless have newer versions of revocation lists.

For example, there may not be an immediate need to employ next-generation extensions for the SRMs until the list of devices has grown so much that the complete list no longer fits in the 5 kb first generation SRM format. During the time when the list is growing but still fits in a first generation SRM, HDCP 2.x and n.x devices will still need to operate with the first generation SRM 301 which is still large enough to list all revoked device identities. Accordingly, if a second generation device presently stores a first generation SRM (e.g., 301) having "SRM Version" of 3 and receives a SRM 1.x having "SRM Version" of 4, the source device may replace its current SRM with the new SRM even though the new SRM 1.x has no second generation SRM extension. Also, as can be seen in "Device IDs" fields of portions 304, 305, KSVs and Receiver IDs may be both be included in revocation lists supplied in either or both portions 304, 305. Thus, until there is a need for SRMs having content greater than, for example, 5 kB, a HDCP 2.x receiver and a HDCP 1.x receiver, regardless of whether either or both are second generation or higher devices having more than 5 kB of memory, may each use SRMs with a first generation 5 kB SRM (e.g., 301) that includes both KSVs and Receiver IDs.

The second generation device may have a longer total number of revoked devices than the first generation device. This may occur because the second generation device may have a list in the first generation SRM portion and another list in the second generation SRM extension whereas the first generation device may have elected to not save the second generation SRM extension portion due to memory constraints. However, various priority schemes may be used to lessen the security disadvantages of the first generation devices. For example, DCP may list the most egregious compromised or pirate device identities the first generation portion of the newly issued second generation SRM. Thus, both first and second generation devices have a list of the most egregious pirate devices.

For purposes of clarity, examples of interoperability methods, systems, and apparatuses are discussed herein between HDCP 1.x, 2.x, and n.x compliant devices. However, embodiments of the invention are not limited to operation with such devices but instead may operate with devices that are compliant with any number of specification versions that may include, without limitation, differing HDCP specifications, differing digital content protection specifications or versions, and/or differing privilege renewability mechanisms. Embodiments of the invention are not limited to operation with SRMs or with any particular version or versions of HDCP. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Variable names may also be interpreted above based on context. For example, when discussing second and third generation devices the second generation device could be considered a "first type" device in regards to the "third generation" device and the "third generation" device may be considered a "second type" device in regards to the second generation device. As another example, in a particular context a device having memory suited to store SRM 302 but not SRM 303 could be considered a first generation device in regards to a device having memory sufficient to store SRM 303 being deemed a second generation device. Also, machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines. The terms "processing system" encompass a single machine or a system of communicatively coupled machines or devices operating together (e.g., distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices). In view of the wide variety of useful permutations that may be readily derived from the example embodiments described herein, this detailed description is intended to be illustrative only, and should not be taken as limiting the scope of the invention. What is claimed as the invention, therefore, is each implementation that comes within the scope and spirit of the following claims, and all equivalents to such implementations.

What is claimed is:

1. An apparatus comprising:
    at least one processor to process privilege renewability content, wherein (a) the apparatus is to transfer protected content to a receiver device and (b) the renewability content is to include first and second type renewability content portions that respectively comprise first and second unique privilege-revoked identifiers for receiver devices; and
    a memory, coupled to the at least one processor, to store the first portion but not the second portion based on whether the apparatus is a first type system, wherein first type systems have less memory capacity to store privilege renewability content than second type systems;
    wherein the at least one processor is to: (a) separate the first portion from the second portion based on whether the apparatus is a first type system, and (b) store the separated first portion in the memory but not the second portion.

2. The apparatus of claim 1, wherein the at least one processor is to:
    obtain a unique first identifier for a first receiver device compliant with a version of a content protection protocol;
    obtain a unique second identifier for a second receiver device compliant with another version of the content protection protocol; and
    send the protected content from the apparatus to both receiver devices based on determining the first and second identifiers are not included in the privilege renewability content.

3. The apparatus of claim 2, wherein the apparatus and first and second receiver devices are included in a heterogeneous, multi-type HDCP system having at least one HDCP 1.x receiver and at least one HDCP 2.x receiver.

4. An article comprising a non-transitory medium storing instructions that enable a processor-based system to:
    process and update privilege renewability content, wherein (a) the system is to transfer protected content to a receiver device and (b) the renewability content is to include first and second type renewability content portions that respectively comprise first and second unique privilege-revoked identifiers for receiver devices; and
    store the first and second portions based on whether the system is a second type system, wherein first type devices have less memory capacity to store privilege renewability content than second type devices;
    wherein the renewability content includes a format that is scalable to operate with source devices of differing types and interoperable to operate with receiver devices compliant with differing content protection protocol versions.

5. The article of claim 4 further storing instructions that enable the system to:
obtain a unique first identifier for a first receiver device compliant with a version of a content protection protocol;
obtain a unique second identifier for a second receiver device compliant with another version of the content protection protocol; and
send the protected content from the system to both receiver devices based on determining the first and second identifiers are not included in the privilege renewability content.

6. The article of claim 5, wherein the system and first and second receiver devices are included in a heterogeneous, multi-type HDCP system.

7. The article of claim 4, further storing instructions that enable the system to: receive both a System Renewability Message (SRM), which includes the privilege renewability content, and protected High-bandwidth Digital Content Protection (HDCP) content, which includes the protected content, in a single digital versatile disk (DVD).

8. The article of claim 4, wherein the format is scalable based at least in part on the second portion being appended to the first portion.

9. The article of claim 4, wherein the first portion includes a first cryptographic signature from a licensing authority and the second portion includes a second cryptographic signature from the licensing authority.

10. An article comprising a non-transitory medium storing instructions that enable a processor-based system to:
process and update privilege renewability content, wherein (a) the system is to transfer protected content to a receiver device and (b) the renewability content is to include first and second type renewability content portions that respectively comprise first and second unique privilege-revoked identifiers for receiver devices;
store the first and second portions based on whether the system is a second type system, wherein first type systems have less memory capacity to store privilege renewability content than second type systems
obtain a unique first identifier for a first receiver device compliant with a version of a content protection protocol;
obtain a unique second identifier for a second receiver device compliant with another version of the content protection protocol; and
send the protected content from the system to both receiver devices based on determining the first and second identifiers are not included in the privilege renewability content.

11. The article of claim 10, wherein the system and first and second receiver devices are included in a heterogeneous, multi-type HDCP system.

12. The article of claim 10, further storing instructions that enable the system to: (a) separate the first portion from the second portion based on the system being a first type system, and (b) store the separated first portion in the memory but not the second portion.

13. The article of claim 10, wherein the renewability content is configured to operate with source devices of differing types and is further configured to operate with receiver devices that are compliant with differing content protection protocol versions.

14. The article of claim 13, wherein the format is scalable based at least in part on the second portion being appended to the first portion.

15. The article of claim 10, further storing instructions that enable the system to: receive both a System Renewability Message (SRM), which includes the privilege renewability content, and protected High-bandwidth Digital Content Protection (HDCP) content, which includes the protected content, in a single digital versatile disk (DVD).

16. The article of claim 10, wherein the first portion includes a first cryptographic signature from a licensing authority and the second portion includes a second cryptographic signature from the licensing authority.

* * * * *

UNITED STATES PATENT AND TRADEMARK OFFICE
CERTIFICATE OF CORRECTION

| | | |
|---|---|---|
| PATENT NO. | : 8,942,376 B2 | Page 1 of 1 |
| APPLICATION NO. | : 13/804780 | |
| DATED | : January 27, 2015 | |
| INVENTOR(S) | : Devanand | |

It is certified that error appears in the above-identified patent and that said Letters Patent is hereby corrected as shown below:

In the claims

Column 12, Claim 4:

Line 58, delete "and";

Line 61, "devices" should be --systems--;

Line 62, "devices;" should be --systems; and--; and

Line 63, should be inserted:

--separate the first portion from the second portion based on whether the system is a first type system, and store the separated first portion in the memory but not the second portion;--.

Signed and Sealed this
Fifth Day of May, 2015

Michelle K. Lee
*Director of the United States Patent and Trademark Office*